United States Patent Office 3,219,112
Patented Nov. 23, 1965

3,219,112
CEMENT COMPOSITIONS AND METHODS
OF UTILIZING SAME
Charles A. Sauber and Mark W. Branstetter, Bartlesville, Okla., assignors to Phillips Petroleum Company, a corporation of Delaware
No Drawing. Filed July 17, 1961, Ser. No. 124,344
10 Claims. (Cl. 166—31)

This invention relates to cement compositions and methods of utilizing said compositions. In one aspect this invention relates to cement compositions and methods of cementing wells to combat lost circulation. In another aspect this invention relates to the cementing of casing in wells.

In the rotary drilling of wells the drilling operation depends on a continuous circulation of drilling fluid from the earth's surface to the bottom of the well bore and back to the surface of the earth. As the drilling progresses, various earth formations are encountered and many of these formations have openings in them ranging from small holes and cracks to large fissures and the like. When such openings in the formations are encountered, drilling fluid flows into them and, in many cases, circulation stops, so that it is necessary to seal said openings before the drilling can be continued.

The problem of combating lost circulation in drilling wells is often a most difficult one to solve. By far the greater number of serious lost circulation zones are found at relatively shallow depths where temperatures are low. Lost circulation is combatted in many ways such as by adding granular, flake, or fibrous material of various sizes to the drilling mud. On some occasions such remedial measures are unsuccessful and other approaches are tried. One of the other approaches is to place cement in the well bore to fill the voids and fissures which cause the lost circulation.

The use of hydraulic natural cement aqueous slurries is not always successful because the low temperatures existing in the wells at the shallow depths where lost circulation is most commonly encountered prevent the cement from reaching an early initial set. Moreover, neat cement is relatively heavy, weighing as much as 15.5 to 16 pounds per gallon, or nearly twice the weight of the water or mud being used to drill the well. Use of such heavy cement slurries may actually aggravate the lost circulation problem because of this additional weight which may actually cause the collapse of a friable formation. Also, when a heavy slurry is placed, it may be driven a long distance from the well bore into the thief formation or zone by its own weight. To be most effective in overcoming lost circulation problems the cement slurry must set up reasonably close to the well bore.

The drilling industry has long been in need of a lightweight, comparatively quick-setting cement to combat lost circulation while drilling. Light-weight cements have been available but their main disadvantage has been extended thickening time at low temperatures. Mixtures of diesel oil and bentonite or cement have been used. The undesirable feature of these systems is that they depend on water being in the thief zone to wet the bentonite or cement.

Time required for the cement to set is an important consideration because during this time the entire drilling rig and its crew are idle at a cost that may run into many hundreds of dollars per day. Fast setting cements will reduce this idle time (known in the industry as "waiting on cement"). Plaster of Paris and similar gypsum cements are fast setting but usually are not satisfactory for controlling lost circulation because they set up too quickly. Such cements will usually set in a very few minutes. A lost circulation cement having a thickening time between 1 and 2 hours, preferably between 1 and 1½ hours, is highly desirable.

The use of retarders such as calcuim lignosulfonate retards the setting of plaster of Paris somewhat but this admix is still very sensitive to contaminants such as salt and Portland cement, as well as temperature and pressure. For this reason, dump bailer technique is used almost exclusively with this type of cement. This naturally limits the volume of slurry placed. Thus, the dump bailer technique, i.e., placing the cement into the bore hole in batches by means of a dump bailer run on a wire line is not nearly as satisfactory as pumping the cement through the drill pipe or a tubing to the zone of lost circulation.

The drilling industry is still faced with the problem or need of a low density lost circulation cement which is comparatively quick setting but which has a properly controlled thickening time, and which is also insensitive to contaminants as well as temperature and pressure. Our invention solves this problem.

It is known that the thickening time of gypsum cement aqueous slurries can be retarded by adding thereto minor amounts of acid carboxymethyl hydroxyethyl cellulose mixed ethers and salts thereof (referred to hereinafter for convenience as CMHEC). However, a disadvantage of incorporating said CMHEC in gypsum cement aqueous slurries is that there result undesirable changes in the rheological properties of the slurry. Both the apparent viscosity and the yield point are increased to the point where the cement slurry is much more difficult to pump into place in the well bore. Since it is desirable to pump the slurry into place rather than employ dump bailer techniques, it would be highly desirable and advantageous if said changes in rheological properties, particularly the increase in yield point, could be avoided. A thick or more viscous cement slurry is desirable in a lost circulation cement because it will have less slump, i.e., it will tend to pile up on itself in the crevices, cracks, or openings, etc., into which it is placed to seal the thief zone. This aids in blocking or filling said crevices, cracks, or openings in the thief zone. However, the yield point, which is a more significant measure of the actual resistance to pumping, must also be considered. Cement slurries having high yield points are extremely difficult to pump.

We have found that, in the presence of diatomaceous earth, the undesirable changes in rehological properties of gypsum cement aqueous slurries which occur upon the incorporation therein of CMHEC are modified. There is still obtained an increase in apparent viscosity, although said increase is desirably somewhat reduced, but most importantly, the yield point is not increased. This results in an improved cement slurry having an optimum apparent viscosity which possesses the desired slump properties but which does not have the undesired increase in yield point, and which is therefore more convenient to pump and place in the cracks or openings in the thief zone.

Thus, in a broad aspect, our invention resides in: a gypsum cement composition comprising gypsum cement, CMHEC, and diatomaceous earth; aqueous slurries of said cement composition containing sufficient water to give a pumpable slurry; and methods of using said cement compositions in the cementing of wells.

Gypsum cements are notoriously sensitive to contamination. Small amounts of contaminants such as calcium chloride, sodium chloride and other salts, and hydraulic cements such as Portland cement act as accelerators and reduce the thickening time. It is highly desirable to avoid such accelerated thickening times because if a cement slurry is formulated to have a specified thickening time it may be extremely costly, or even disastrous, for the cement to thicken too soon and set before it can be properly placed in the well bore. Sodium chloride and Portland cement are the two contaminants most commonly encountered when using gypsum cement aqueous slurries. Sodium chloride is present in many formations in the earth and such deposits serve as a source of contamination. Contamination of a gypsum cement slurry with Portland cement can easily occur when the cementing trucks which are used to transport and/or pump the gypsum cement slurry have previously been used to handle a Portland cement slurry.

We have found that gypsum cement slurries containing CMHEC and diatomaceous earth can be rendered substantially or completely resistant to contaminants (insofar as thickening time is concerned) by incorporating therein an alkali metal silicate. This discovery makes it possible to provide an additional control over the thickening time of specially formulated gypsum cement slurries. This additional control is necessary when the utmost control is desired and it is essential to assure the successful placement of the cement slurry in the well.

Thus, in a more preferred embodiment, our invention resides in: a gypsum cement composition comprising gypsum cement, CMHEC, diatomaceous earth, and an alkali metal silicate; aqueous slurries of said cement composition containing sufficient water to give a pumpable slurry; and methods of using said cement compositions in the cementing of wells.

The above-described gypsum cement compositions of the invention are quite valuable and useful because they solve long existing problems in the drilling art. Said compositions thus represent a distinct advance in the art. However, gypsum cements are expensive. We have found that a portion of the gypsum cement in the above-described cement compositions can be replaced with a less expensive hydraulic natural cement without sacrificing the above-described beneficial changes in the rheological properties of the cement slurry. Indeed, as described further hereinafter, the rheological properties of gypsum cement slurries are improved by the incorporation therein of a portion of a hydraulic natural cement, such as Portland cement.

Thus, in a still more preferred embodiment, our invention resides in: a cement composition comprising a mixture of gypsum cement and a hydraulic natural cement as the cement component, CMHEC, and diatomaceous earth; aqueous slurries of said cement composition containing sufficient water to give a pumpable slurry; and methods of using said cement composition in the cementing of wells.

Said cement compositions of the invention comprising a mixture of gypsum cement and a hydraulic natural cement can also be rendered insensitive to contamination by salts such as sodium chloride.

Thus, in a presently most preferred embodiment, our invention resides in: a cement composition comprising a mixture of gypsum cement and a hydraulic natural cement as the cement component, CMHEC, diatomaceous earth, and an alkali metal silicate; aqueous slurries of said cement composition containing sufficient water to give a pumpable slurry; and methods of using said compositions in the cementing of wells.

An object of this invention is to provide an improved cement composition which is particularly adapted for cementing or sealing cracks, fractures, or other openings in formations. Another object of this invention is to provide an improved cement composition which is particularly adapted to be employed in cementing wells to seal cracks, fractures, or other openings in formations penetrated by said well and which is thus particularly adapted for combatting lost circulation in the drilling of wells. Another object of this invention is to provide an improved light weight, comparatively quick-setting cement composition which can be employed in cementing wells to combat lost circulation. Still another object of this invention is to provide an improved cement composition having improved rheological properties and which is particularly adapted to be employed in cementing wells to combat lost circulation. Another object of this invention is to provide a light weight, comparatively quick-setting cement composition which is particularly adapted for combating lost circulation in wells, and which is also resistant to contamination. Another object of this invention is to provide an improved cement composition which can be employed in cementing casing in shallow wells. Other aspects, objects, and advantages of the invention will be apparent to those skilled in the art in view of this disclosure.

Thus, the cement component of the cement compositions of the invention can contain from 25 to 100 weight percent of a gypsum cement and from 75 to 0 weight percent of a hydraulic natural cement, preferably from 25 to 75 weight percent of a gysum cement and from 75 to 25 weight percent of a hydraulic natural cement, more preferably from 35 to 65 weight percent of a gypsum cement and from 65 to 35 weight percent of hydraulic natural cement. It is understood that the total weight percentages present, or the parts by weight of gypsum cement and hydraulic natural cement, in said cement component always equals 100.

By gypsum cements this invention includes all cementitious mixtures containing more than 66% of calcined gypsum as defined by the American Society for Testing Materials in their standards for gypsum cements of 1942, pages 94 to 131 inclusive, as amended in 1950. Calcined gypsum has an average formula of one molecule of calcium sulfate for each one-half molecule of water, as calculated from the $SO_3$ content, and is as follows:

$$CaSO_4 \cdot \tfrac{1}{2} H_2O$$

This includes all standard gypsum neat plaster, scratch or first coat plaster, brown or second coat plaster, gypsum molding plaster, gypsum pottery plaster, Keene's cement, gypsum dental plaster, calcined terra alba, calcined selenite, calcined alabaster, Hydrocal (trademark name for gypsum cement, or alpha gypsum, made according to U.S. patent to Wilbur S. Randel et al., 1,901,051 of March 14, 1933), alpha gypsum, Certrock (trademark name for calcined gypsum plus some 1 to 2 percent mixture of gum arabic and alkaline reacting materials such as lime, litharge, or soda ash), Hydrostone (trademark name for Hydrocal given the Certrock treatment), Hydromite (trademark name for calcined gypsum plus carbamide-formaldehyde resin), calcined gypsum autoclaved with minor amounts of neutralized organic acids, such as maleic, cinnamic, adipic, o-phthalic succinic acid and other dicarboxylic salts (see Industrial Engineering Chemistry 41 (1949) No. 5, pp. 1061–1065), plaster of Paris, Cal-Seal (a trademark for treated plaster of Paris, see World Oil, August 1949, pp. 119–126) including Cal-Seal 60 and Cal-Seal HT, and all other like gypsum cements.

By hydraulic natural cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic natural cements. Hydraulic natural cements include hydraulic limes, grappier cements, puzzolan cements, and Portland cements. Puzzolan cements include slag cements made from slaked lime and granulated blast furnace slag. Because of its superior strength Portland cement is preferred among the hydraulic natural cements, but as the art of cements recognizes hydraulic natural cements as a definite class, and as results of value may be obtained with any member of that class, it is desired to claim all hydraulic natural cements. In addition to the ordinary construction grades of Portland cement or other hydraulic natural cements, modified hydraulic natural cements and Portland cements designated as high-early-strength cement, heat resistant cement, and slow-setting cement may be used in the present invention. The "Condensed Chemical Dictionary," 3rd Edition, 1942, published by Reinhold Publishing Corporation, New York, N.Y., page 173, column 2, paragraph 4, entitled "Natural Cements," shows the preceding definition and classification of hydraulic natural cements is recognized and followed by those skilled in the art.

CMHEC is used herein as an abbreviation for a cement thickening time extending and water loss reducing agent selected from the group consisting of acid carboxyalkyl hydroxyethyl cellulose mixed ethers in which the alkyl group contains one to two carbon atoms. The presently preferred acid carboxyalkyl hydroxyethyl cellulose mixed ethers for use in the practice of the invention are those in which the total substitution per anhydroglucose unit of the cellulose of both carboxyalkyl and hydroxyethyl groups is between 0.5 to 1.75, the hydroxyethyl substitution is from 0.35 to 1.35, and the carboxyalkyl substitution is from 0.15 to 1.2, and metal, ammonium, amide, and other salts of said mixed ethers, but preferably the alkali metal salts thereof. It is preferred at present to use the sodium or potassium salts of said acid cellulose derivative merely because these salts are readily available commercially and therefore relatively inexpensive. Sodium carboxymethyl hydroxyethyl cellulose mixed ether is the presently most preferred salt. However, any other alkali metal salts, such as the lithium, rubidium, caesium and other rare alkali metal salts, or the ammonium or organic base salts, such as the pyridine, triethanolamine, morpholine salts of said acid cellulose derivative, all of which are water soluble or hydrolize in the cement slurry, are useful in the practice of the invention.

As acid carboxymethyl hydroxyethyl cellulose mixed ether and its salts are common articles of commerce, which may be purchased from the Hercules Powder Company or others, no other description of them is regarded as necessary. Methods of preparation will be found in many printed publications earlier than the filing date of the present application known to those skilled in the art.

The use of CMHEC in hydraulic cement aqueous slurries and in gypsum cement aqueous slurries as a cement thickening time extending and water loss reducing agent is known in the prior art. However, the use of CMHEC in combination with diatomaceous earth in gypsum cement containing aqueous slurries to obtain the above-described beneficial changes in rheological properties of the slurries is not known to the prior art. While some benefits as a thickening time extending and water loss reducing agent are obtained in the use of CMHEC in the practice of the invention, these benefits are of secondary importance in the lost circulation cements of the invention. The primary benefits obtained in using CMHEC in the cements of this invention are the newly discovered and unexpected beneficial changes in rheological properties when CMHEC is used in combination with diatomaceous earth in aqueous cement slurries containing a gypsum cement or a mixture of gypsum and hydraulic cements. For this reason, it is preferred to refer to CMHEC simply as an "additive" instead of the more limiting description of "thickening time extending and water loss reducing agent" of the prior art.

The amount of CMHEC used in the cement compositions of the invention will usually be in the range of 0.1 to 10, preferably 0.1 to 5, more preferably 0.2 to 3 weight percent of the dry weight of the cement component, i.e., the dry gypsum cement or the dry mixture of gypsum and hydraulic cement. Said weight percentages are equivalent to parts by weight per 100 parts by weight of the dry cement.

The "Celite" brand of diatomaceous earth is preferred but any technical grade of diatomaceous earth or infusorial earth such as kieselguhr, guhr, diatomite, tripolite, tellurine, tetta silicea, ceyssatite, or fossil flour can be employed to obtain valuable results. The diatomaceous earth is preferably ground coarsely enough to preserve substantially at least a major portion of the diatom siliceous skeletons. However, not all diatomaceous earths are equivalent because not all diatomaceous earths will permit the use of sufficient water to obtain the desired low densities.

It is preferred to use a diatomaceous earth having a maximum bleeding value not exceeding 3.0. The term "bleeding value" as used herein is defined as the volume of water in milliliters which separates from 250 milliliters of the slurry as supernatant liquid when the slurry is allowed to remain quiescent for three hours at 70–85° F. in a 250 milliliter graduated mixing cylinder having an internal diameter of 3.7 centimeters±0.3 centimeter.

The amount of diatomaceous earth used in the cement compositions of the invention will usually be in the range of 10 to 100 weight percent, preferably 20 to 70 weight percent of the dry weight of the cement component, i.e., the dry gypsum cement or the dry mixture of gypsum and hydraulic cements. Said weight percentages are equivalent to parts by weight per 100 parts by weight of the dry cement.

The alkali metal silicates used in the practice of the invention, preferably sodium, potassium and lithium silicates, are most preferably sodium silicates having a silicon dioxide ($SiO_2$) to sodium oxide ($Na_2O$) weight ratio of from 1 to 2.5, preferably 1.6 to 2.5, and most preferably 2. While said alkali metal silicates can be used as an anhydrous salt, a hydrated salt containing various amounts of water of hydration, and as predissolved solutions, the use of anhydrous salts and particularly sodium silicate dry anhydrous salt is preferred for dry blending with the cement. Alkali metal silicates, for example sodium silicates with these $SiO_2$ to $Na_2O$ ratios, are not compounds having a definite formula, but are intimate mixtures of molecular structures averaging such ratios. For example metasilicate $Na_2SiO_3$, disilicate $Na_2Si_2O_5$, tetrasilicate $Na_2Si_4O_9$ and many other silicates of different ratios may be present.

The amount of alkali metal silicate used in the cement compositions of the invention will usually be in the range of 0 to 10, preferably 1 to 7 weight percent of the dry weight of the cement component, i.e., the dry gypsum cement or the dry mixture of gypsum and hydraulic cement. Said weight percentages are equivalent to parts by weight per 100 parts by weight of the dry cement component.

The amount of water used to make the slurry can vary widely as long as sufficient water is added to make the slurry fluid and pumpable. For example, the invention is operable with from about 80 to about 400 percent water, and higher, by weight of the dry cement component. It is preferred to keep the amount of water used within the following limits when employing the indicated amounts of diatomaceous earth. The percent figures given are percent by weight of the dry weight of the cement component and are thus equivalent to parts by weight per 100 parts by weight of the dry cement component.

| D.E., Percent | Water, Percent | |
| --- | --- | --- |
|  | Min. | Max. |
| 10 | 80 | 110 |
| 20 | 110 | 140 |
| 30 | 140 | 180 |
| 40 | 170 | 300 |
| 60 | 250 | 360 |
| 70 | 330 | 400 |

Generally speaking, the more preferred amount of water for each amount of diatomaceous earth is about half way between the above shown minimum and maximum amounts of water. The maximum amount of water can be defined as the largest percent which can be contained in the slurry without resulting in appreciable settling of the solids in the slurry or excessive bleeding of water at the surface of the slurry. The minimum water content can be defined as the least amount which can be used without exceeding a consistency of 25 to 35 poises during the first 15 minutes as determined with the high pressure consistometer (A.P.I. Code 10B, Fifth Edition).

The following examples will serve to further illustrate the invention. Except where otherwise stated the cement composition slurries were prepared by dry blending the dry ingredients on a roller blender. The dry blend was added to a measured amount of water and slurried with a Waring Blendor or with a Kitchen Aid mixer in accordance with the procedure described in API Code RP 10B. Full details regarding such blending procedures can be found in the said code. All apparatus and testing procedures employed were the same as those given in said API Code RP 10B, 8th Edition, 1959, except where otherwise stated. For example, the thickening time test procedure on the super pressure consistometer was varied for certain formulations and is so noted in connection with said formulations. The CMHEC used in all examples was sodium carboxymethyl hydroxyethyl cellulose. The Portland cement was a commercial grade of ASTM Class A cement. The gypsum cement was a commercial grade known as Cal-Seal 60. The alkali metal silicate was sodium silicate having a silicon dioxide to sodium oxide mol ratio of 2.

*Example I*

A series of cement composition aqueous slurries having the compositions given in Table I below were prepared as described above.

TABLE I.—THICKENING OF CEMENT SLURRIES BY ADDITION OF CMHEC

| Run No. | Gypsum Cement,a Parts by Wt. | Portland Cement, Parts by Wt. | CMHEC, Parts by Wt. | DE,b Parts by Wt. | Water, Parts by Wt. | Apparent Viscosity, cp. | Yield Point, lbs./100 ft.$^2$ |
|---|---|---|---|---|---|---|---|
| 1 | 100 | 0 | 0 | 0 | 46 | 30.0 | 0 |
| 2 | 100 | 0 | 0.5 | 0 | 46 | 130.0 | 34 |
| 3 | 0 | 100 | 0 | 0 | 46 | 55.0 | 76 |
| 4 | 0 | 100 | 0.5 | 0 | 46 | 95.0 | 80 |
| 5 | 50 | 50 | 0. | 0 | 46 | 69.0 | 88 |
| 6 | 50 | 50 | 0.5 | 0 | 46 | 120.0 | 100 |
| 7 | 100 | 0 | 0 | 40 | 220 | 21.0 | 16 |
| 8 | 100 | 0 | 1.5 | 40 | 220 | 37.0 | 16 |
| 9 | 100 | 0 | 0 | 40 | 250 | 14.0 | 10 |
| 10 | 100 | 0 | 1.5 | 40 | 250 | 23.5 | 9 |
| 11 | 0 | 100 | 0 | 40 | 220 | 25.0 | 34 |
| 12 | 0 | 100 | 1.5 | 40 | 220 | 25.0 | 12 |
| 13 | 0 | 100 | 0 | 40 | 250 | 17.0 | 18 |
| 14 | 0 | 100 | 1.5 | 40 | 250 | 16.0 | 5 |
| 15 | 50 | 50 | 0 | 40 | 220 | 24.0 | 32 |
| 16 | 50 | 50 | 1.5 | 40 | 220 | 25.0 | 12 |
| 17 | 50 | 50 | 0. | 40 | 250 | 16.5 | 15 |
| 18 | 50 | 50 | 1.5 | 40 | 250 | 17.5 | 7 | a Cal-Seal 60.   b Diatomaceous earth.

Referring to said Table I, a comparison of Runs 1 and 2, 3 and 4, and 5 and 6 shows that the incorporation of CMHEC into the neat cement compositions of Runs 1, 3, and 5 caused an increase in both the apparent viscosity and the yield point in all three neat cement compositions.

Comparing Runs 7 and 8 with Runs 9 and 10 shows that the incorporation of CMHEC in the gypsum cement aqueous slurries of Runs 7 and 9 which contained diatomaceous earth resulted in a much smaller increase in the apparent viscosity and no increase at all in the yield point. This represents a marked improvement in the rheological properties of the cement slurries and is due to the use in combination of CMHEC and diatomaceous earth in the gypsum cement aqueous slurries.

A comparison of Runs 15 and 16, and 17 and 18, shows that the incorporation of CMHEC in the gypsum-Portland cement aqueous slurries of Runs 15 and 17 which contained diatomaceous earth caused essentially no increase in the apparent viscosity and there was a marked decrease in the yield point. Again, the use of CMHEC and diatomaceous earth in combination has resulted in a marked improvement in rheological properties.

*Example II*

A series of cement composition aqueous slurries having the compositions given in Table II below were prepared as described above.

TABLE II.—RESISTANCE OF CEMENT SLURRIES TO CONTAMINATION

| Run No. | Gypsum Cement,a Parts by wt. | Portland Cement, Parts by wt. | CMHEC, Parts by wt. | DE,b Parts by wt. | Sodium Silicate, Parts by wt. | Water, Parts by wt. | Contaminant, Parts by wt. | | | API Thickening Time, Hrs.: Min. | |
|---|---|---|---|---|---|---|---|---|---|---|---|
| | | | | | | | Calcium Chloride | Sodium Chloride | Portland Cement | 4,000' | 8,000' |
| 1 | 100 | 0 | 0 | 40 | 0 | 220 | 0 | 0 | 0 | 0:31 | 0:27 |
| 2 | 100 | 0 | 0 | 40 | 0 | 220 | 2 | 0 | 0 | ------ | 0:22 |
| 3 | 100 | 0 | 0 | 40 | 0 | 220 | 0 | 2.5 | 0 | 0:17 | 0:11 |
| 4 | 100 | 0 | 0 | 40 | 0 | 220 | 0 | 0 | 2.5 | 0:20 | 0:22 |
| 5 | 100 | 0 | 0.2 | 40 | 0 | 220 | 0 | 0 | 0 | ------ | 1:10 |
| 6 | 100 | 0 | 0.2 | 40 | 0 | 220 | 0 | 2.5 | 0 | ------ | 0:25 |
| 7 | 100 | 0 | 0.2 | 40 | 0 | 220 | 0 | 0 | 2.5 | ------ | 0:35 |
| 8 | 100 | 0 | 0.5 | 40 | 5 | 220 | 0 | 0 | 0 | 1:10 | ------ |
| 9 | 100 | 0 | 0.5 | 40 | 5 | 220 | 0 | 0 | 2.5 | 1:08 | ------ |
| 10 | 100 | 0 | 0.7 | 40 | 0 | 220 | 0 | 0 | 0 | ------ | 3:25 |
| 11 | 100 | 0 | 0.7 | 40 | 0 | 220 | 0 | 0 | 2.5 | ------ | 1:18 |
| 12 | 100 | 0 | 0.7 | 40 | 5 | 220 | 0 | 0 | 0 | 1:21 | ------ |
| 13 | 100 | 0 | 0.7 | 40 | 5 | 220 | 0 | 0 | 2.5 | 1:30 | ------ |
| 14 | 50 | 50 | 0 | 40 | 0 | 220 | 0 | 0 | 0 | 0:12 | 0:14 |
| 15 | 50 | 50 | 0 | 40 | 0 | 220 | 0 | 2.5 | 0 | 0:10 | 0:10 |
| 16 | 50 | 50 | 0.5 | 40 | 0 | 220 | 0 | 0 | 0 | ------ | 5:00+ |
| 17 | 50 | 50 | 0.5 | 40 | 0 | 220 | 0 | 2.5 | 0 | ------ | 1:41 |
| 18 | 50 | 50 | 0.5 | 40 | 5 | 220 | 0 | 0 | 0 | ------ | 3:00+ |
| 19 | 50 | 50 | 0.5 | 40 | 5 | 220 | 0 | 2.5 | 0 | ------ | 3:00+ | a Cal-Seal 60.   b Diatomaceous earth.

An examination of the data obtained in Runs 1–7 inclusive of said Table II shows that the cement composition aqueous slurries containing gypsum cement and diatomaceous earth, or those containing gypsum cement, diatomaceous earth, and CMHEC, are all sensitive to contaminants such as calcium chloride, sodium chloride, and Portland cement. However, when one compares the data in Runs 8–13 inclusive with said Runs 1–7 inclusive, it is evident that when sodium silicate is incorporated in said gypsum cement slurries which also contain both CMHEC and diatomaceous earth, said slurries are rendered insensitive to said contaminants. This is shown by a comparison between Runs 8 and 9 which are identical in composition except that the composition of Run 8 does not contain any contaminant; yet both compositions had essentially the same thickening time. A comparison of Runs 10 and 11 with Runs 12 and 13 shows similar results.

It is well known that Portland cement aqueous slurries are sensitive to contamination by sodium chloride with a resulting decrease in thickening time. In view of this, the results of Runs 14–19 inclusive are very interesting. These runs show that when sodium silicate is present along with both diatomaceous earth and CMHEC in cement composition aqueous slurries wherein the cement component is a mixture of a gypsum cement and Portland cement, the slurry is rendered insensitive to contamination.

The data in Table II clearly show that cement composition aqueous slurries containing a gypsum cement must contain all three of the additives diatomaceous earth, CMHEC, and an alkali metal silicate if one desires a slurry which is insensitive to or possesses the maximum resistance to contamination.

*Example III*

The presently most preferred cement compositions of the invention, i.e., those wherein the cement component is a mixture of a gypsum cement and a hydraulic natural cement, possess another valuable property. This is the property of "setting on being quiescent" and is illustrated by the data given in Table III below.

However, when the maximum (or plateau) is reached, if the cement slurry is allowed to remain quiescent by discontinuing the stirring for a short time, the consistency of the slurry will rapidly increase to 100 poises or more. Thus, in the modified API thickening times given in Table III, after the consistency of the slurry had reached the maximum or plateau value, stirring was discontinued for short intervals of about 10 minutes each and the consistency of the slurry (with resumed stirring) was determined at the end of each interval. It is usually found that the consistency will measure 100 poises or more after one or two such quiescent intervals.

This property is very important in a lost circulation cement because as a result thereof a cement aqueous slurry having a reasonable thickening time of about 1 to 2 hours can be safely placed in a well bore by pumping same through the drill pipe and after the agitation of pumping has stopped the cement will set within a very short time. This means that after the cement has been displaced from the well bore into the opening in the formation which it is desired to seal, it will set within a very short time. This insures very little migration away from the well bore and reduces the amount of time waiting on cement to set before drilling operations can be resumed.

*Example IV*

This example illustrates the use of one of the new cement compositions of the invention in combatting and stopping lost circulation in a commercial well drilled in Alfalfa County, Oklahoma.

During the drilling of this well circulation of the drilling fluid was lost at a depth of from 452 to 460 feet. Circulation was restored and the well was drilled ahead to 524 feet at which circulation was lost again. A new batch of drilling mud was mixed in an attempt to regain circulation. This was unsuccessful. At this time the drill pipe was flushed with diesel oil and a mixture of 1,000 gallons of diesel oil and 43 sacks of bentonite was pumped through the drill pipe into the well. Circulation was temporarily regained but was again lost. The bottom of the drill pipe was raised to 350 feet from the surface of the earth and 100 sacks of neat Portland cement slurried

TABLE III

| Run No. | Gypsum Cement,[a] Parts by wt. | Portland Cement, Parts by wt. | CMHEC, Parts by wt. | DE,[b] Parts by wt. | Sodium Silicate, Parts by wt. | Water, Parts by wt. | API Thickening Time, Hrs:Min. | | | | | | | |
|---|---|---|---|---|---|---|---|---|---|---|---|---|---|---|
| | | | | | | | 2,000[1] | | 4,000' | | 6,000' | | 8,000' | |
| | | | | | | | API | Mod.[c] | API | Mod.[c] | API | Mod.[c] | API | Mod.[c] |
| 1 | 50 | 50 | 0.3 | 40 | 0 | 200 | 3:00+ | 1:47 | -------- | -------- | -------- | -------- | 3:00+ | 1:00 |
| 2 | 50 | 50 | 0.5 | 40 | 0 | 200 | 3:00+ | 2:32 | -------- | -------- | -------- | -------- | 3:00+ | 1:20 |
| 3 | 50 | 50 | 0.5 | 40 | 5 | 200 | 3:00+ | 0:58 | 3:00+ | 1:00 | -------- | -------- | -------- | -------- |
| 4 | 50 | 50 | 0.5 | 40 | 7 | 200 | -------- | -------- | 3:00+ | 1:00 | -------- | -------- | -------- | -------- |

[a] Cal-Seal 60.   [b] Diatomaceous earth.   [c] Modified test as described below.

The gypsum-hydraulic natural cement aqueous slurry compositions of Runs 1–4 in Table III were prepared in the same manner as described above and then tested to determine the API thickening times thereof. As is well known to those skilled in the art, said API thickening time is determined in a super pressure consistometer employing constant stirring. When the consistency or the apparent viscosity of the slurry reaches 100 poises, the slurry is said to have thickened or set. This is known as the API thickening time. When one plots the obtained consistency values as the ordinate vs. elapsed time at the moment of measuring said consistency as the abscissa, aqueous cement slurries like those in Runs 1–4 of Table II show a relatively rapid increase to a maximum of less than 100 poises consistency and then "level off" to form a "plateau." The consistency then slowly increases from the plateau value over a period of several hours to a value of 100 poises at which time the test is terminated.

with sufficient water to give a pumpable slurry was pumped into the well. A Portland cement slurry containing 200 sacks of Portland cement, 0.5 weight percent based on the dry weight of the cement of Flocele, and sufficient water to give a pumpable slurry was then pumped into the well. The top of the cement was found at 450 feet. The cement was drilled out between 450 and 460 feet and drilling continued with circulation. Circulation was again lost between 1351 and 1432 feet while drilling shale and anhydrite. Circulation could not be restored and when the total depth had reached 1432 feet the bottom of the drill pipe was raised to 270 feet from the surface of the earth. At this time a cement aqueous slurry consisting of 27 sacks of Portland cement, 25 sacks of Cal-Seal 60 gypsum cement, 120 cubic feet of diatomaceous earth, 15 pounds of sodium carboxymethyl hydroxyethyl cellulose ether, and 250 pounds of sodium silicate having a silicon dioxide to sodium oxide mol ratio of 2 was pumped through the drill pipe and into the formation or formations penetrated. The drill pipe was then pulled from the hole and the well was allowed to set for two hours after which the drill pipe was returned to the hole and fluid was found at a depth of 70 feet from the surface. The hole was then filled with water and stood full showing that the thief zones had been sealed. The drill pipe was then run to the bottom of the hole with full circulation and drilling was resumed. The well was then drilled to a total depth of 5543 feet with no further lost circulation difficulties.

The composition of the above lost circulation cement which successfully solved the described severe lost circulation problem was, in the terms of reference used in this application, as follows:

| | Parts by weight |
|---|---|
| Cal-Seal 60 | 50 |
| Portland cement | 50 |
| CMHEC | 0.3 |
| Diatomaceous earth | 40 |
| Sodium silicate | 5 |
| Water | 220 |
| Density | lbs./gallon 11.1 |

It will be noted that this composition is substantially the same as the composition of Run No. 3 in Table III above. It is believed that the cement slurry used in said well as described above undoubtedly exhibited the above-described "setting on being quiescent" property because after only two hours waiting on the cement to set it was found that when the hole was filled with water, the hole stood full showing that the thief zone or zones had been sealed and drilling could be successfully continued to a total depth of 5543 feet without any further lost circulation difficulties. While not actually measured, the bottom hole temperature in this well at the depth of approximately 1400 feet was probably less than 90° F. This demonstrates the value of the cements of the invention in combatting lost circulation in shallow wells where low temperatures exist.

While the cement compositions of the invention find their greatest utility in combatting lost circulation as described herein, said cement compositions are also useful in cementing casings in wells, particularly in shallow wells at depths of 8,000 feet and less. The presently preferred cement composition aqueous slurries containing a 50–50 mixture of gypsum cement and hydraulic natural cement are particularly valuable for this added utility.

In cementing casings in wells using the cement compositions of the invention, the dry cement component is mixed with one or more of the other agents in the amounts described above. The mixing of said agents with the cement need not occur anywhere near the well being cemented but can take place any number of miles away, and several months before, and the ready mixed cement composition brought to the well in sacks or in a bulk cement truck. The dry cement composition is then mixed in any suitable manner, such as by jet mixers, with a sufficient amount of water to form a pumpable slurry. The amount of water employed can vary widely as described above. Said slurry is then pumped down through the casing and is forced upward around the outer surface of the casing into the annulus between said casing and borehole and is thus brought into contact with said casing and an earth formation penetrated by said borehole. If desired, instead of forcing said cement slurry out of the end of the casing, the slurry can be forced through perforations in the lower portion of the casing or in an intermediate portion of the casing. Cement slurries made in accordance with the invention are adaptable for use in squeeze cementing operations or in any other operations wherein cement slurry is brought into contact with the well casing and a formation penetrated by the bore hole.

The U.S. patents now in Class 166, Wells, Subclass 21, Cementing or Plugging (and indented subclasses) disclose a number of other suitable cementing processes which can be employed in our invention.

The same mixing procedures can be employed in mixing the lost circulation cements of the invention.

The cement compositions of the invention are also useful in grouting and sealing cracks, fractures, or other openings in man-made formations such as dams, breakwaters, walls, massive foundations and other structures.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A cement composition consisting essentially of: a cement component consisting essentially of from 25 to 75 parts by weight of a gypsum cement containing more than 66 weight percent of calcined gypsum and from 75 to 25 parts by weight of a hydraulic natural cement, the total parts by weight of said gypsum cement and said hydraulic natural cement in said cement component always equaling 100; from 10 to 100 parts by weight per 100 parts by weight of said cement component of diatomaceous earth; from 0.1 to 10 parts by weight per 100 parts by weight of said cement component of an additive selected from the group consisting of acid carboxyalkyl hydroxyethyl cellulose mixed ethers in which the alkyl group contains from 1 to 2 carbon atoms, and salts of said mixed ethers; and from 1 to 7 parts by weight per 100 parts by weight of said cement component of an alkali metal silicate having a silicon dioxide to alkali metal oxide mol ratio of from 1 to 2.5; said cement composition, when slurried with sufficient water to produce a pumpable slurry, having the property of being insensitive to the accelerating action of sodium chloride contaminant on thickening time.

2. The cement composition of claim 1 wherein: the amount of said additive in said cement composition is within the range of from 0.1 to 5 parts by weight per 100 parts by weight of said cement component; and the total substitution for anhydroglucose unit of the cellulose of carboxyalkyl and hydroxyethyl groups in said additive is within the range of 0.5 to 1.75, the hydroxyethyl substitution is within the range of 0.35 to 1.35, and the carboxyalkyl substitution is within the range of 0.15 to 1.2.

3. A cement composition consisting essentially of: a major portion of a cement component consisting essentially of from 35 to 65 parts by weight of a gypsum cement containing more than 66 weight percent of calcined gypsum and from 65 to 35 parts by weight of a hydraulic natural cement, the total parts by weight of said gypsum cement and said hydraulic cement in said cement component always equaling 100; from 20 to 70 parts by weight per 100 parts by weight of said cement component of diatomaceous earth; from 0.1 to 5 parts by weight per 100 parts by weight of said cement component of an alkali metal carboxymethyl hydroxyethyl cellulose mixed ether in which the total substitution per anhydroglucose unit of the cellulose of carboxymethyl and hydroxyethyl groups is within the range of 0.5 to 1.75, the hydroxyethyl substitution is within the range of 0.35 to 1.35, and the carboxymethyl substitution is within the range of 0.15 to 1.2; and from 1 to 7 parts by weight per 100 parts by weight of said cement component of an alkali metal silicate having a silicon dioxide to alkali metal oxide mol ratio of from 1 to 2.5; said cement composition, when slurried with sufficient water to produce a pumpable slurry, having the property of being insensitive to the accelerating action of sodium chloride contaminant on thickening time.

4. The cement composition of claim 3 wherein said hydraulic cement is Portland cement, said alkali metal carboxymethyl hydroxyethyl cellulose mixed ether is sodium carboxymethyl hydroxyethyl cellulose, and said alkali metal silicate is sodium silicate.

5. A cement composition aqueous slurry consisting essentially of: a cement component consisting essentially of from 25 to 75 parts by weight of a gypsum cement containing more than 66 weight percent of calcined gypsum and from 75 to 25 parts by weight of a hydraulic natural cement, the total parts by weight of said gypsum cement and said hydraulic natural cement in said cement component always equaling 100; from 10 to 100 parts by weight per 100 parts by weight of said cement component of diatomaceous earth; from 0.1 to 5 parts by weight per 100 parts by weight of said cement component of an additive selected from the group consisting of acid carboxyalkyl hydroxyethyl cellulose mixed ethers in which the alkyl group contains from 1 to 2 carbon atoms, and salts of said mixed ethers, the total substitution per anhydroglucose unit of the cellulose of carboxyalkyl and hydroxyethyl groups in said additive being within the range of 0.5 to 1.75, the hydroxyethyl substitution being within the range of 0.35 to 1.35, and the carboxyalkyl substitution being within the range of 0.15 to 1.2; from 1 to 7 parts by weight per 100 parts by weight of said cement component of an alkali metal silicate having a silicon dioxide to alkali metal oxide mol ratio of from 1 to 2.5; and sufficient water to produce a pumpable slurry, said slurry having the property of being insensitive to the accelerating action of sodium chloride contaminant on thickening time.

6. The cement composition aqueous slurry of claim 5 wherein said hydraulic cement is Portland cement, said alkali metal carboxymethyl hydroxyethyl cellulose mixed ether is sodium carboxymethyl hydroxyethyl cellulose, and said alkali metal silicate is sodium silicate.

7. The cement composition aqueous slurry of claim 5 wherein said amount of water sufficient to produce a pumpable slurry is an amount within the range of from 110 to 400 parts by weight per 100 parts by weight of said cement mixture.

8. The method of combatting lost circulation of drilling fluid in a well by sealing openings in formations penetrated by the bore hole of said well, which method comprises placing in said bore hole adjacent at least one of said formations and into said openings a cement composition aqueous slurry consisting essentially of: a major portion of a cement component consisting essentially of from 35 to 65 parts by weight of a gypsum cement containing more than 66 weight percent of calcined gypsum and from 65 to 35 parts by weight of a hydraulic natural cement, the total parts by weight of said gypsum cement and said hydraulic cement in said cement component always equaling 100; from 20 to 70 parts by weight per 100 parts by weight of said cement component of diatomaceous earth; from 0.1 to 5 parts by weight per 100 parts by weight of an alkali metal carboxymethyl hydroxyethyl cellulose mixed ether in which the total substitution per anhydroglucose unit of the cellulose of carboxymethyl and hydroxyethyl groups is within the range of 0.5 to 1.75, the hydroxyethyl substitution is within the range of 0.35 to 1.35, and the carboxymethyl substitution is within the range of 0.15 to 1.2; from 1 to 7 parts by weight per 100 parts by weight of said cement component of an alkali metal silicate having a silicon dioxide to alkali metal oxide mol ratio of from 1 to 2.5; and sufficient water to produce a pumpable slurry, said slurry having the property of being insensitive to the accelerating action of sodium chloride contaminant on thickening time.

9. The method of claim 8 wherein said hydraulic cement is Portland cement, said alkali metal carboxymethyl hydroxyethyl cellulose mixed ether is sodium carboxymethyl hydroxy ethyl cellulose, said alkali metal silicate is sodium silicate, said amount of water sufficient to produce a pumpable slurry is from 110 to 400 parts by weight per 100 parts by weight of said cement component, and said slurry has a thickening time in place in said well within the range of from 1 to 12 hours.

10. The method of combatting lost circulation of drilling fluid in a well by sealing openings in formations penetrated by the bore hole of said well, which method comprises placing in said bore hole adjacent at least one of said formations and into said openings a cement composition aqueous slurry consisting essentially of: a cement component consisting essentially of from 25 to 75 parts by weight of a gypsum cement containing more than 66 weight percent of calcined gypsum and from 75 to 25 parts by weight of a hydraulic natural cement, the total parts by weight of said gypsum cement and said hydraulic cement in said cement component always equaling 100; from 10 to 100 parts by weight per 100 parts by weight of said cement component of diatomaceous earth; from 0.1 to 5 parts by weight per 100 parts by weight of said cement component of an additive selected from the group consisting of acid carboxyalkyl hydroxyethyl cellulose mixed ethers in which the alkyl group contains from 1 to 2 carbon atoms, and salts of said mixed ethers, the total substitution per anhydroglucose unit of the cellulose of carboxyalkyl and hydroxyethyl groups in said additive being within the range of from 0.5 to 1.75, the hydroxyethyl substitution being within the range of from 0.35 to 1.35, and the carboxyalkyl substitution being within the range of from 0.15 to 1.2; from 1 to 7 parts by weight per 100 parts by weight of said cement component of an alkali metal silicate having a silicon dioxide to alkali metal oxide mol ratio of from 1 to 2.5; and sufficient water to produce a pumpable slurry, said slurry having the property of being insensitive to the accelerating action of sodium chloride contaminant on thickening time.

References Cited by the Examiner

UNITED STATES PATENTS

| | | | |
|---|---|---|---|
| 2,761,511 | 9/1956 | Billue | 166—79 |
| 2,852,402 | 9/1958 | Shell | 166—31 |
| 2,909,223 | 10/1959 | Kaveler | 166—31 |
| 2,924,277 | 2/1960 | Shell et al. | 166—33 |
| 2,985,239 | 5/1961 | Shell | 106—76 X |

CHARLES E. O'CONNELL, *Primary Examiner.*

NORMAN YUDKOFF, BENJAMIN HERSH,
*Examiners.*